United States Patent
Roth et al.

(10) Patent No.: US 10,563,773 B2
(45) Date of Patent: Feb. 18, 2020

(54) FLUID SYSTEM COUPLING WITH INTERNAL VALVES

(71) Applicant: OPW-Engineered Systems, Inc., Lebanon, OH (US)

(72) Inventors: Joseph P. Roth, Milford, OH (US); David Morrow, Cincinnati, OH (US); Donald M. Johnson, Mason, OH (US)

(73) Assignee: OPW-ENGINEERED SYSTEMS, INC., Lebanon, OH (US)

( * ) Notice: Subject to any disclaimer, the term of this patent is extended or adjusted under 35 U.S.C. 154(b) by 0 days.

(21) Appl. No.: 15/599,355

(22) Filed: May 18, 2017

(65) Prior Publication Data
US 2017/0335974 A1  Nov. 23, 2017

Related U.S. Application Data

(60) Provisional application No. 62/339,351, filed on May 20, 2016.

(51) Int. Cl.
| | | |
|---|---|---|
| *F16K 1/36* | (2006.01) | |
| *F16L 37/12* | (2006.01) | |
| *F16L 37/44* | (2006.01) | |
| *F16K 1/12* | (2006.01) | |
| *F16K 31/60* | (2006.01) | |

(52) U.S. Cl.
CPC .............. *F16K 1/36* (2013.01); *F16K 1/12* (2013.01); *F16K 31/602* (2013.01); *F16L 37/1205* (2013.01); *F16L 37/44* (2013.01); *Y10T 137/87933* (2015.04); *Y10T 137/87949* (2015.04)

(58) Field of Classification Search
CPC ...... Y10T 137/87933; Y10T 137/87957; Y10T 137/87949; Y10T 137/87965; F16L 37/40; F16L 37/30; F16L 37/44; F16K 1/36

See application file for complete search history.

(56) References Cited

U.S. PATENT DOCUMENTS

| | | | | |
|---|---|---|---|---|
| 2,739,827 A * | 3/1956 | Krone et al. | .......... | F16L 37/101 137/614.06 |
| 3,473,569 A | 10/1969 | Guertin et al. | | |
| 3,590,862 A * | 7/1971 | De Graaf | .............. | F16K 15/033 137/522 |
| 4,271,865 A * | 6/1981 | Galloway et al. | .... | F16L 37/101 137/614.06 |
| 5,628,344 A * | 5/1997 | Roberts | ................... | F16L 37/20 137/614 |
| 6,155,294 A * | 12/2000 | Cornford et al. | ....... | F16L 37/30 137/614 |
| 6,622,760 B2 * | 9/2003 | Peattie | ................. | B67D 7/0294 141/206 |

(Continued)

*Primary Examiner* — Kevin L Lee
(74) *Attorney, Agent, or Firm* — Workman Nydegger

(57) ABSTRACT

A fluid system coupling includes an adaptor, a coupler, and an actuation mechanism. The adaptor has an adaptor poppet that is movable between an open position and a closed position. The adaptor poppet has a poppet face that is substantially planar and devoid of any recesses. The coupler has a coupler poppet that is movable between an open position and a closed position. The coupler poppet has a poppet face that is substantially planar and avoid of any recesses. The actuation mechanism selectively moves the poppets from the closed positions to the open positions.

18 Claims, 5 Drawing Sheets

(56) References Cited

U.S. PATENT DOCUMENTS

| | | | |
|---|---|---|---|
| 7,040,358 B2 * | 5/2006 | Lacroix | B67D 7/42 141/206 |
| 8,985,131 B2 * | 3/2015 | Cheon et al. | F16L 37/367 137/1 |

* cited by examiner

FLUID SYSTEM COUPLING WITH INTERNAL VALVES

This application claims priority to and the benefit of U.S. Provisional Application No. 62/339,351, filed May 20, 2016, and entitled VALVED COUPLER, the entire content of which is incorporated herein by reference.

BACKGROUND

1. Technical Field

Exemplary embodiments of the present disclosure relate to fluid system components. More particularly, exemplary embodiments of the present disclosure relate to valved coupling devices for use in fluid systems.

2. The Relevant Technology

In recent years, environmental concerns have been receiving significantly more attention, and various governmental agencies have responded by implementing stringent regulations to reduce or prevent pollution. Many of these regulations and concerns are directed towards those industries that transport fluids. For example, it is very difficult to transport a fluid without spilling or leaking some of the fluid into the environment. Thus, some environmental regulations require that minimal leaking occur during handling, processing, or transportation of the fluid.

These environmental concerns become especially clear when considering the magnitude of the industries that handle fluids that can cause significant damage in small quantities. There is a concern, therefore, to protect both the public and the environment from these types of fluids. While some fluids that are transported, such as water and milk, may not pollute the environment when they are leaked or spilled, the loss of fluid into the environment is nevertheless viewed as a general waste of resources. More generally, the loss of fluid into the environment is not desirable even if the fluid does not contribute to pollution.

Within the transportation industry, a variety of different devices are used to transport a fluid from a source to a destination. These devices often use valve assemblies and conduits of various types to both connect the source to the destination as well as to manage fluid flow through the conduit. Usually, the conduit is pressurized to direct fluid toward the desired destination. With each transfer of fluid, there is a risk that leakage will occur due to human error, equipment malfunctions, or the like. As previously stated, it is desirous and often critical to ensure that the spills or leaks are substantially minimized.

A common source of fluid leaks and fluid spills are the connections between various components of the fluid systems. For example, when a fuel transport vehicle is delivering liquid through a conduit such as a hose into a fuel tank, the hose is attached to the vehicle at one end and to a fuel tank at the other end. The hose may be attached to the fuel tank via a coupler and an adaptor, each of which includes a valve. Even when the coupler and adaptor are connected and disconnected properly, and their associated valves function properly, current couplers, adaptors, and their associated valves often allow for fluids to leak, spill, or otherwise be exposed to the environment.

Accordingly, what is desired are coupling devices that minimize the amount of fluid that is able to escape therefrom or otherwise be exposed to the environment.

BRIEF SUMMARY

Exemplary embodiments of the present disclosure relate to coupling devices that limit the amount of fluid that is able to escape therefrom or is otherwise exposed to the environment. For example, in one embodiment, a fluid system coupling includes an adaptor having a body at least partially defining a fluid passageway therethrough. An adaptor poppet is movably disposed in the body and is movable between an open position and a closed position. The adaptor poppet is configured to seal off an open end of the adaptor when the adaptor poppet is in the closed position. The adaptor poppet is biased toward the closed position. Additionally, the adaptor poppet has a poppet face that is substantially planar and devoid of any recesses. In some embodiments, at least 95% of the poppet face comprises a uniform planar surface that is devoid of any recesses. In some embodiments, the poppet face includes an alignment feature that takes up less than 5% of the poppet face and has a height or depth that is less than 0.25 inches relative to the uniform planar surface of the poppet face.

A coupler of the fluid system coupling includes a body at least partially defining a fluid passageway therethrough. The coupler is selectively connectable to the adaptor. The coupler has a coupler poppet movably disposed therein such that the coupler poppet is movable between an open position and a closed position. The coupler poppet is configured to seal off an open end of the coupler when the coupler poppet is in the closed position. The coupler poppet has a poppet face that is substantially planar and avoid of any recesses. In some embodiments, at least 95% of the poppet face comprises a uniform planar surface that is devoid of any recesses. In some embodiments, the poppet face includes an alignment feature that takes up less than 5% of the poppet face and has a height or depth that is less than 0.25 inches relative to the uniform planar surface of the poppet face.

An actuation mechanism of the fluid system coupling is associated with the coupler. The actuation mechanism is configured to move the coupler poppet from the closed position to the open position. Movement of the coupler poppet from the closed position to the open position causes the coupler poppet to engage the adaptor poppet and move the adaptor poppet from the closed position to the open position.

These and other objects and features of the present disclosure will become more fully apparent from the following description and appended claims, or may be learned by the practice of the disclosed embodiments as set forth hereinafter.

BRIEF DESCRIPTION OF THE DRAWINGS

To further clarify the above and other advantages and features of the present disclosure, a more particular description will be rendered by reference to specific embodiments thereof which are illustrated in the appended drawings. It is appreciated that these drawings depict only typical embodiments and are therefore not to be considered limiting of its scope, nor are the drawings necessarily drawn to scale. The disclosure will be described and explained with additional specificity and detail through the use of the accompanying drawings in which.

DETAILED DESCRIPTION

Figure 1:
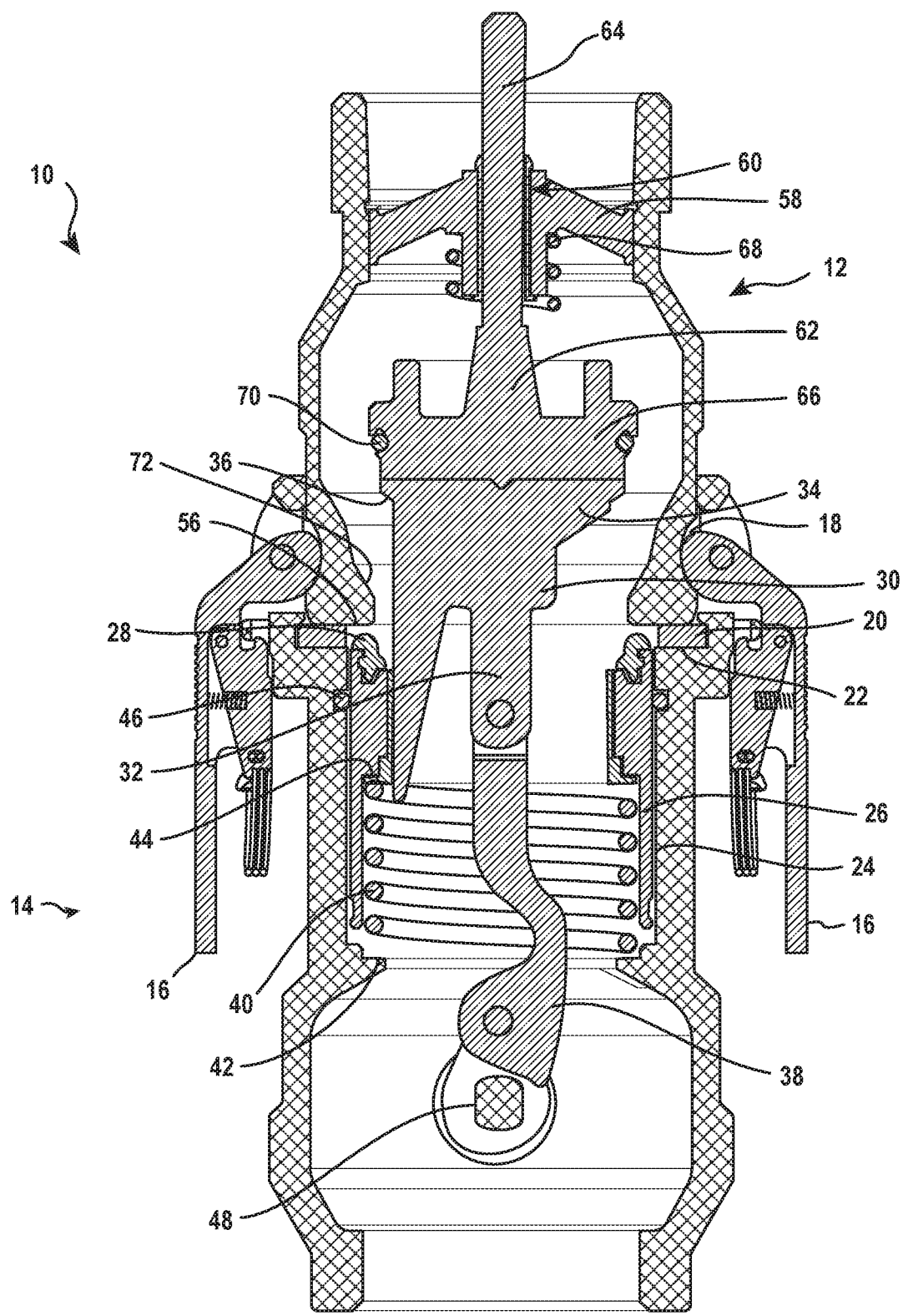
FIG. 1 is a sectional view of the coupling device according to one embodiment of the present disclosure showing the adaptor and coupler secured together and cooperating valve assemblies in open positions.

Reference will now be made to the drawings to describe various aspects of exemplary embodiments of the disclosure. It is understood that the drawings are diagrammatic and schematic representations of such exemplary embodiments, and are not limiting of the present disclosure. While the drawings are not necessarily drawn to scale, the drawings may be to scale for some embodiments. No inference should therefore be drawn from the drawings as to the dimensions of any embodiment or element, unless indicated otherwise. In the following description, numerous specific details are set forth in order to provide a thorough understanding of the present disclosure. It will be obvious, however, to one of ordinary skill in the art that the present disclosure may be practiced without these specific details.

While the various features of the present disclosure are hereinafter illustrated and described as being particularly adaptable to fluid systems handling dangerous and flammable fluids, it is to be understood that various features of the present disclosure can be utilized singly or in any combination thereof to provide coupling devices for use with any fluid whether in a liquid or gaseous state.

In the exemplary embodiment of the present disclosure illustrated in the drawings, an improved coupling device or coupling 10 is illustrated. Coupling 10 includes a pair of cooperating members selectively securable together about a common axis by fastening features provided on such members. The cooperating members are readily fastened together irrespective of their angular positions about such axis. Each of the cooperating members includes a valve assembly for sealing fluid therein when the cooperating members are disconnected from one another, thereby providing a dry-break, such that a very limited amount of fluid, if any, spills or is lost from the coupling device when the cooperating members are taken apart. Each valve assembly includes a face that interacts with the face of the other valve assembly when the cooperating members are connected to one another. The faces of the valve assemblies can be planar or devoid of recesses in which fluid may be trapped. An actuating mechanism is provided in at least one of the cooperating members for opening and closing the valve assemblies within the coupling to control fluid flow through the coupling.

As illustrated in FIG. 1 of the drawings, coupling device 10 includes a male member or adaptor 12 and a female member or coupler 14. Both adaptor 12 and coupler 14 are generally cylindrical in shape and the terminal end portion of adaptor 12 is received in a cooperating receiving bore in an associated end portion of coupler 14.

Fastening features are provided for fastening and unfastening adaptor 12 and coupler 14 about a common axis and irrespective of their angular orientation about such axis. The fastening features include a pair of handles 16 pivotally connected to coupler 14 on opposite sides thereof and a cooperating annular groove 18 in adaptor 12. The pair of handles 16 may be pivoted between a locked position as shown in FIG. 1 and an unlocked position. When handles 16 are in the locked position shown in FIG. 1, a contour on each handle 16 projects beyond the inner circumferential surface of coupler 14 and is received within groove 18 to secure coupler 14 and adaptor 12 together to form coupling device 10. In contrast, when handles 18 are pitted outwardly to be unlocked position, the previously projecting contour is rotated away from adaptor 12 and out of groove 18 so that adaptor 12 may be withdrawn from within coupler 14.

Thus, it is seen that coupling 10 is uncoupled or unfastened by lifting its handles 16 toward adaptor 12 to enable separation of adaptor 12 and coupler 14. Coupling 10 is coupled or fastened by inserting adaptor 12 within the receiving bore of coupler 14 so that the terminal end portion of adaptor 12 engages a seal 20 supported on a shoulder 22 of coupler 14 and then lowering handles 16 toward the body of coupler 14. With adaptor 12 fastened in position with its terminal end portion engaging seal 20, a fluid seal is provided assuring that fluid carried within coupling 10 and its associated conduit system does not leak out. As will be apparent from the drawings, seal 20 acts in effect as a double or backup seal while fluid is flowing through coupling 10.

An actuating mechanism is provided for controlling fluid flow through coupling device 10. The actuating mechanism in the illustrated embodiment is carried by coupler 14 and will be described in greater detail below.

A valve assembly is provided within coupler 14. With coupling device 10 in its coupled position, the actuating mechanism carried by coupler 14 opens the valve assembly to allow fluid to flow through the coupling 10. When coupling 10 uncoupled, the valve mechanism in coupler 14 assures that even when the actuating mechanism is in the open position fluid contained within coupler 14 does not leak out.

Coupler 14 has a cylindrical bore 24 therein. Disposed within bore 24 is a cylindrical sleeve 26. Sleeve 26 is configured for telescoping or receptacle movement within bore 24. A seal 28 is provided on the outer terminal edge of sleeve 26.

A valve assembly is disposed within coupler 14. In the illustrated embodiment, the valve assembly includes a poppet 30. The poppet 30 is provided for cooperation with sleeve 26. Poppet 30 has a stem 32 arranged generally coaxially within sleeve 26 and a generally circular disk-like head portion 34. Head 34 has an inner peripheral portion 36 which cooperates with the seal 28 of sleeve 26 to provide a fluid seal therebetween as shown in FIGS. 2 and 3.

Poppet 30 is supported within coupler 14 for axial movement generally along the axis of sleeve 26. The axial movement of poppet 30 is controlled by a linkage assembly 38. The linkage assembly 38 is connected at one end to the stem 32 and an opposite end to the actuating mechanism.

Figure 2:
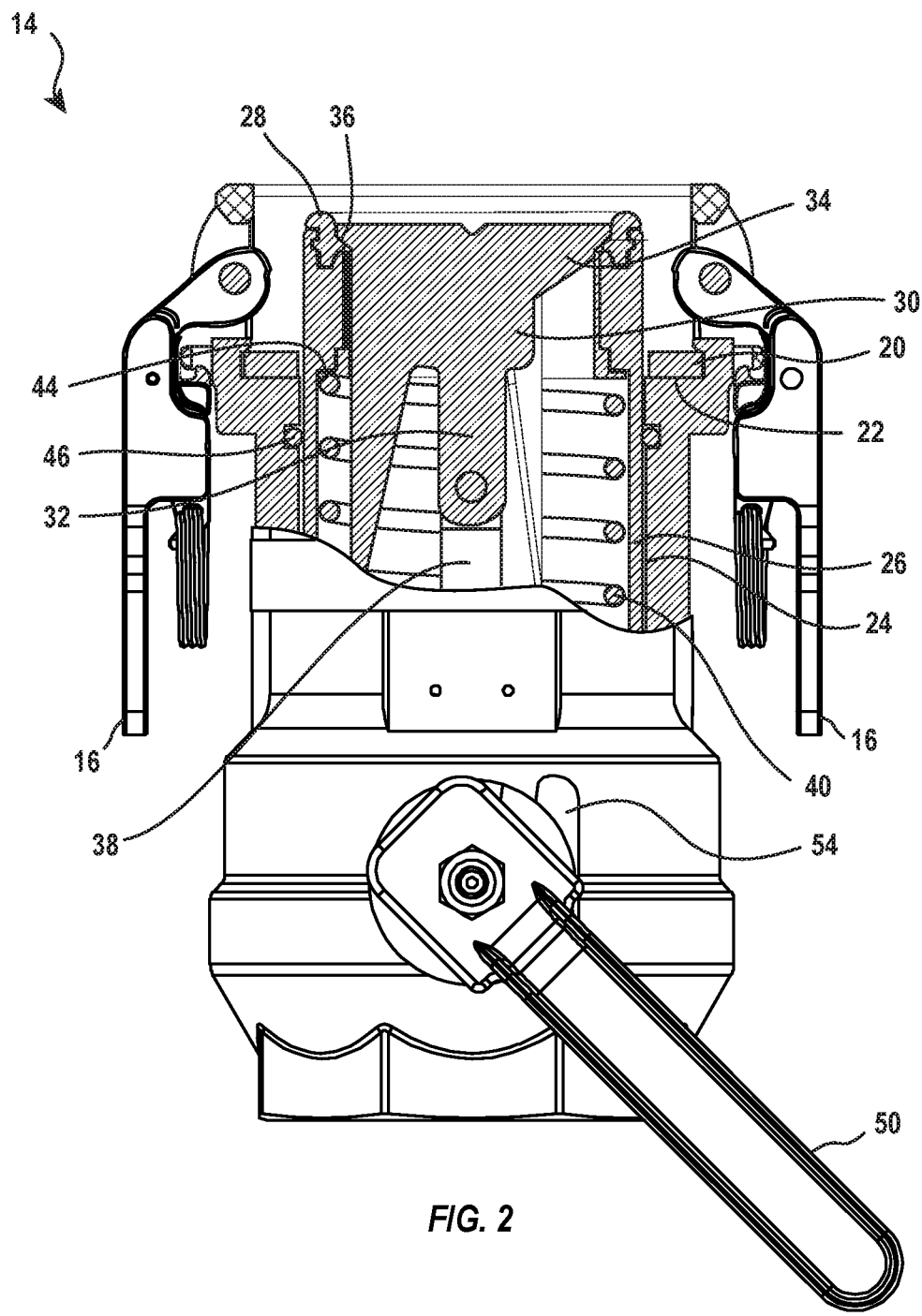
FIG. 2 is a partial cutaway view of the coupler of the coupling device of FIG. 1 showing the valve assembly in a closed, extended position.
Figure 3:
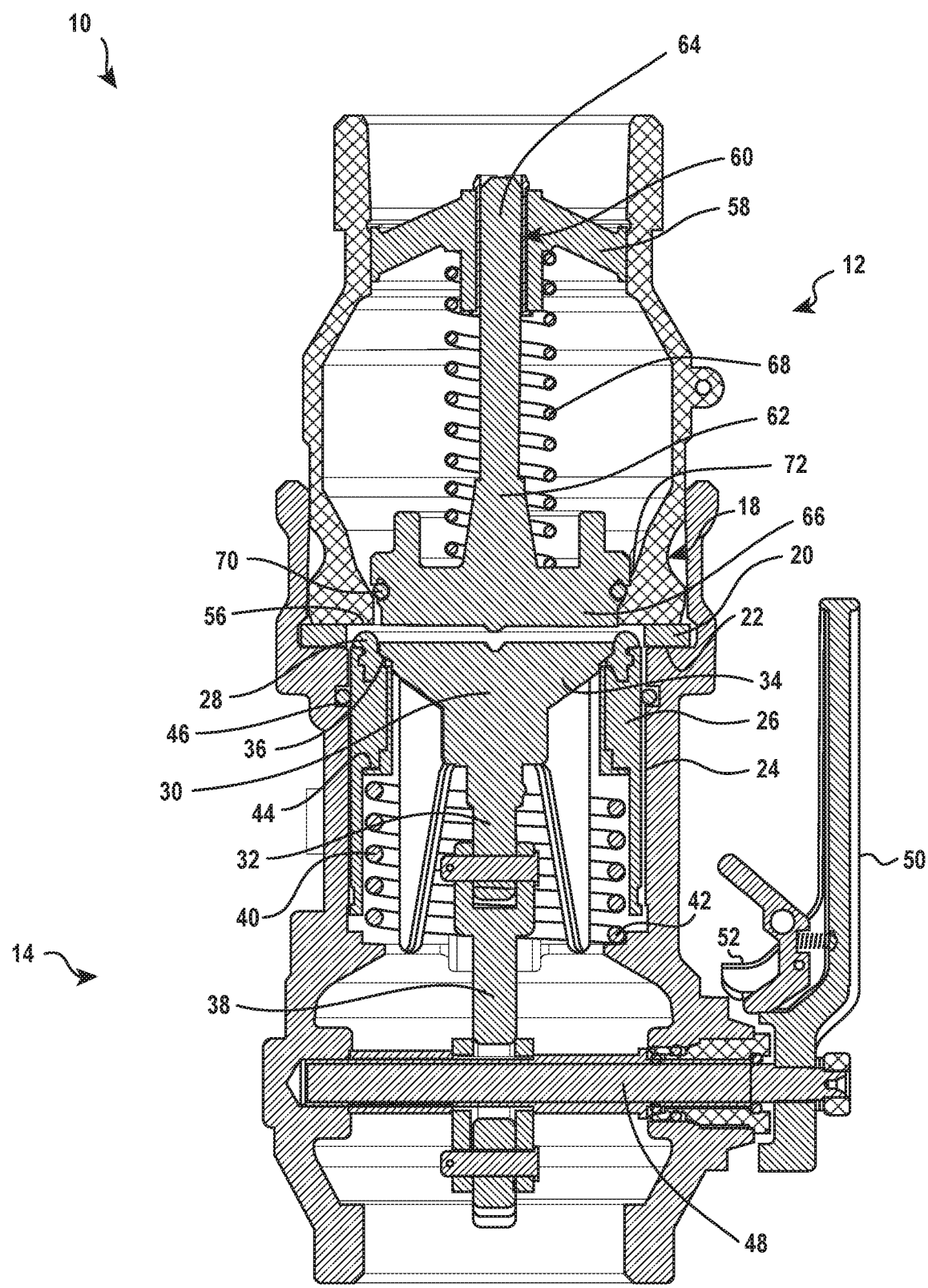
FIG. 3 is another sectional view of the coupling device of FIG. 1 showing the adaptor and coupler secured together and cooperating valve assemblies in closed positions.

A biasing mechanism 40 is provided for urging sleeve 26 outwardly so that seal 28 engages peripheral portion 36 of poppet head 34, as illustrated in FIG. 2. The urging of sleeve 26 and seal 28 toward poppet head 34 by biasing mechanism 40 creates a seal between sleeve 26 and poppet 30 regardless of the axial position of poppet 30 when adaptor 12 and coupler 14 are disconnected from one another. In the illustrated embodiment, the biasing mechanism 40 comprises a compression spring. One end of spring 40 engages a shoulder 42 on coupler 14 and a second end of spring 40 engages a shoulder 44 on the sleeve 26. An O-ring type seal 46 is also provided between coupler 14 and sleeve 26 to assure that fluid leakage does not occur between such members. As illustrated in FIG. 2, with coupler 14 unfastened from adaptor 12, telescoping sleeve 26 is urged by spring 34 to follow poppet 30 and maintain a fluid seal throughout the entire range of travel of poppet 30.

An actuating mechanism is provided for opening and closing the valve assemblies in coupling 10 when adaptor 12 and coupler 14 are coupled together. Opening and closing the valve assemblies can control fluid flow through coupling 10. The actuating mechanism includes a shaft 48 rotatably mounted at least partially within coupler 14. The linkage assembly 38 connects the shaft 48 to the poppet 30. The shaft 48 or the linkage assembly 38 can be configured to move the poppet 30 upon rotation of the shaft 48. For instance, the linkage assembly 38 may include an eccentric link or cam that, upon rotation by the shaft 48, moves the poppet 30 along the axis of the coupler 14. In alternative embodiments, the shaft 48 may include a bend or eccentric portion. As the shaft 48 is rotated, the bend or eccentric portion can move the poppet 30.

The actuating mechanism also includes an actuating handle 50, as illustrated in FIGS. 2 and 3. The actuating handle 50 is connected to shaft 48 such that movement or rotation of actuating handle 50 rotates the shaft 48. Handle 50 can include a projection 52 that projects toward coupler 14. The projection 52 may engage one or more stops 54 (see FIG. 2) to limit the extent to which the handle 50 may be rotated. The stops 54 may be positioned such that when the projection 52 is engaged therewith, the valve assemblies within the coupling 10 are in either the open or closed position.

It will now be apparent from FIG. 2 that if actuating handle 50 were inadvertently moved to the open position when coupler 14 is uncoupled from adaptor 12, sleeve 26 would follow poppet 30 two maintain a fluid seal throughout the entire range of movement of poppet 30.

It can also be seen in FIG. 2 that when actuator handle 50 is moved to the open position, poppet 30 and sleeve 26 are extended outwardly past their normal position shown in FIG. 3. As result, it would be impossible to couple the adaptor 12 and coupler 14 together until such time as actuating handle 50 is moved to the closed position. Thus, two features are readily illustrated, namely that inadvertent actuation of handle 50 with the coupling 10 uncoupled does not result in loss of fluid from coupler 14 and that it is physically impossible to fasten adaptor 12 and coupler 14 together until the actuating handle 50 is moved to its closed position.

Adaptor 12 is in the form of a generally cylindrical body that has a first end that can be received in coupler 14. The first end of adaptor 12 includes a terminal outer sealing surface 56 that engages seal 22 disposed in coupler 14. As can be seen in FIG. 1, once coupler 14 and adaptor 12 are secured together and the actuating mechanism is activated (e.g., via handle 50) to move the valve assemblies to their open positions, the seal 28 on sleeve 26 engages sealing surface 56 and provides a fluid tight seal.

Adaptor 12 has a bridge 58 therein that defines a bore 60. A valve assembly is disposed within the adaptor 12 and includes a second poppet 62. The poppet 62 includes a stem 64 and a head portion 66. Stem 62 is axially slidable back and forth in bore 60. A biasing mechanism 68 (e.g., spring) mounted between the bridge 58 and the head portion 66 urges the poppet 62 to a closed position.

A seal 70 is disposed on the head portion 66 of poppet 62. With device 10 uncoupled, biasing mechanism 68 urges poppet 62 so that seal 70 is urged into sealing engagement with a chamfer 72 provided in the terminal inner end portion of adaptor 12. The engagement between the seal 70 and the chamfer 72 closes the first end of the adaptor 12 and prevents fluid from leaking out of adaptor 12.

In operation, the handle 50 is moved to its normally closed position. The adaptor 12 and coupler 14 are then secured together. More specifically, the adaptor 12 is inserted into the coupler 14 and the handles 16 are pivoted toward the outside of the coupler 14 so that the projections engage the grooves 18 on the adaptor 14. As can be seen in FIG. 3, when the adaptor 12 and coupler 14 are connected, the poppet heads 34, 66 are positioned face-to-face with one another. Upon actuation of handle 50, the poppet 30 is advanced into engagement with the poppet 62. Continued rotation of handle 50 advances the poppet 30 into the adaptor 12, as shown in FIG. 1. Notably, as can be seen in FIG. 1, the sealing surface 56 on adaptor 12 is positioned in front of sleeve 26 so as to prevent biasing mechanism 40 from advancing sleeve 26 and seal 28 with the poppet 30. Accordingly, as poppet 30 advances into adaptor 12, the seal between poppet head 34 and seal 28 is broken. Additionally, as the poppet 30 advances into adaptor 12, poppet 30 pushes on poppet 62, thereby unseating the poppet head 66 and seal 70 from the chamfer 72. With the poppets 30, 62 in the open positions shown in FIG. 1, fluid can flow through coupling 10.

Note that in this position, poppet 62 is held with its biasing mechanism 68 in a compressed position and sleeve 26 is held with its biasing mechanism 40 in a compressed position. If, inadvertently, handles 16 were to be moved to unfasten coupling 10 while handle 40 is in the open position, practically instantaneously, poppet 62 would be urged by biasing mechanism 68 toward chamfer 72 to seal adaptor 12. Likewise, sleeve 26 would be urged by biasing mechanism 40 to telescope against poppet 30 to seal coupler 14. Thus, a dry break is essentially provided even under these adverse conditions. As will be apparent from the foregoing description, and during normal operation, the actuating mechanism in effect overrides the valve assemblies in both the adaptor 12 and coupler 14 to provide flow through coupling 10.

Upon completion of a fluid transfer, the handle 50 can be rotated in the opposite direction to move the poppets 30, 62 from the open position shown in FIG. 1 to the closed position shown in FIG. 3. Rotation the handle 50 retracts the poppet 30 out of the adaptor 12 and back into sealing engagement with seal 28. As the poppet 30 is retracted out of the adaptor 12, the poppet 62 is urged by the biasing mechanism 68 back into engagement with chamfer 72. With the valve assemblies closed, the adaptor 12 and coupler 14 can be disconnected from one another.

Figure 4:
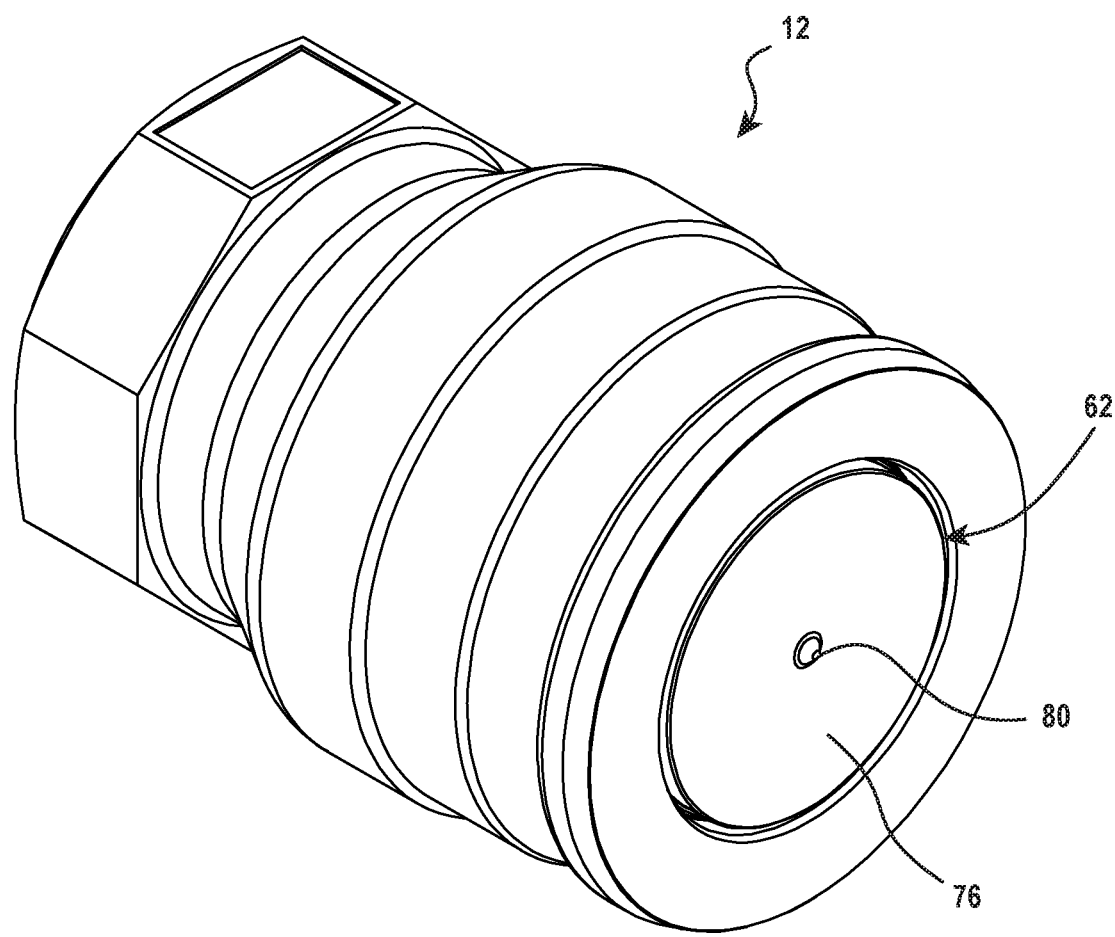
FIG. 4 is an end perspective view of the adaptor of the coupling device of FIG. 1.
Figure 5:
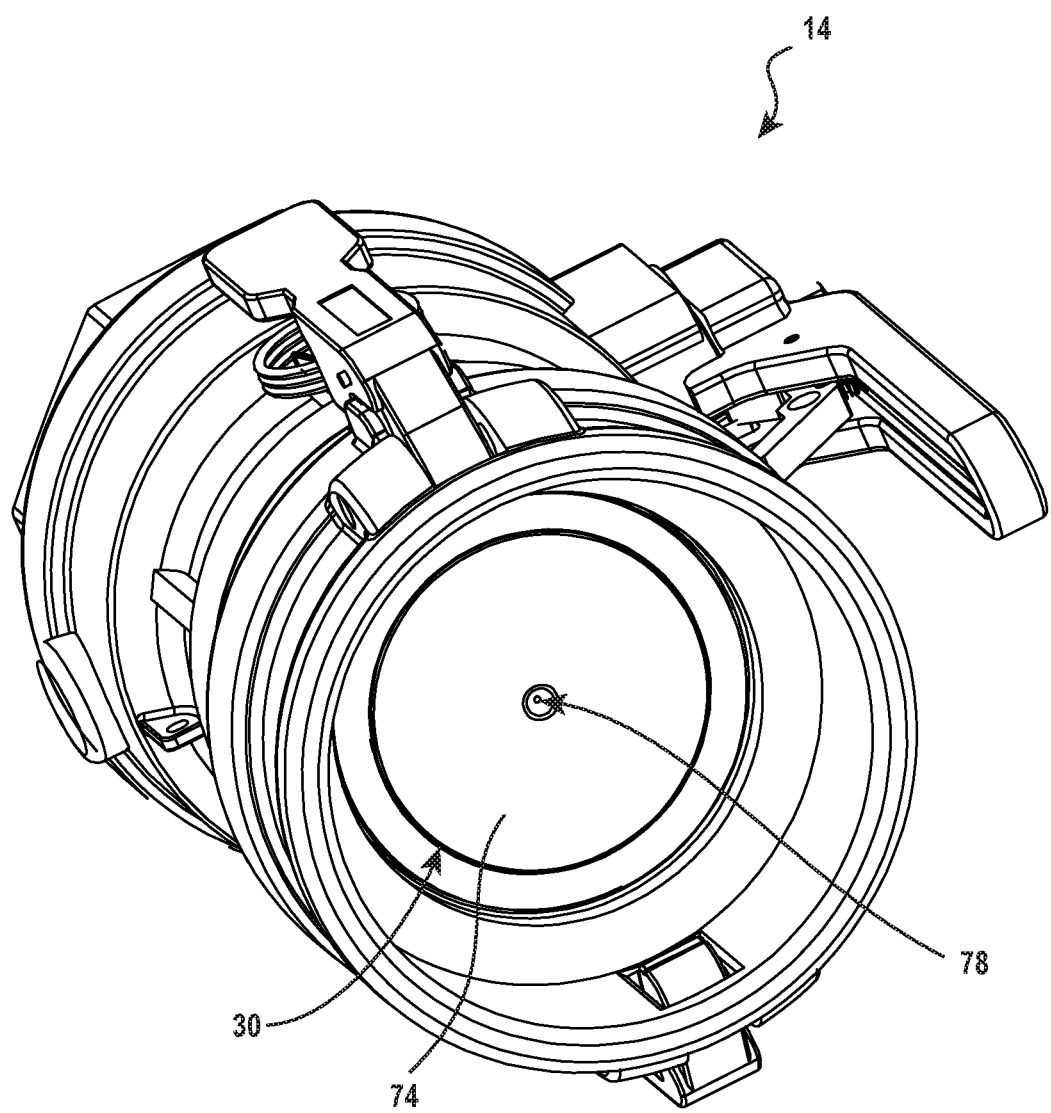
FIG. 5 is an end perspective view of the coupler of the coupling device of FIG. 1.

With continued attention to FIGS. 1-3, attention is now also directed to FIGS. 4 and 5, which illustrate end views of the adaptor 12 and coupler 14. As can be seen in the Figures, the poppets 30, 62 include faces 74, 76, respectively. In the illustrated embodiment, the faces 74, 76 are substantially planar. More specifically, the entire or nearly the entire surfaces of faces 74, 76 are flat and devoid of any projections or recesses. Such configuration of faces 74, 76 can limit or prevent fluids from being trapped between faces 74, 76. If fluids were able to be trapped between faces 74, 76, such fluids may be released into or exposed to the environment when adaptor 12 and coupler 14 are disconnected from one another. For instance, if one or both of the faces 74, 76 included a recess, fluid may accumulate and remain in that recess when the adaptor 12 and coupler 14 are disconnected from one another. Such fluid may also drip or spill from the adaptor or coupler upon disconnection. When such fluids are hazardous to the environment such exposure to the environment can be detrimental.

To limit or prevent fluid from being trapped between the faces 74, 76 and exposing such fluids to the environment, the faces 74, 76 may be devoid of such recesses or may at least limit the size thereof. For instance, in some embodiments, the entirety of faces 74, 76 are uniformly flat or planar and do not include any projections or recesses. In other embodiments, however, substantial portions of the faces 74, 76 may be uniformly flat or planar and may be devoid of any projections are recesses. For example, 50%, 60%, 70%, 75%, 80%, 85%, 90%, 95%, 97%, 98%, 99% or more of each face 74, 76 may be uniformly flat or planar and devoid of any projections are recesses.

In the illustrated embodiment, the faces 74, 76 include alignment features 78, 80, respectively. More specifically, the face 74 includes a small recess 78 therein. The face 76 includes a corresponding projection 80 extending from the center thereof. When the poppet 30 is advanced into engagement with the poppet 62, the projection 80 is received within the recess 78. The projection 80 and the recess 78 may have complementary shapes and sizes. In some embodiments, the projection 80 may be sized and/or shaped such that, as the projection 80 enters the recess 78, any fluid within the recess 78 is forced out.

As can be seen in the Figures, the dimensions of the recess 78 and the projection 80 can be quite small. For instance, the recess 78 and the projection 80 can take up less than 1 square inch on each of the faces 74, 76. In other embodiments, the recess 78 and the projection 80 can take up less than 0.75 square inches, 0.5 square inches, 0.25 square inches, or 0.1 square inches on each of the faces 74, 76. Additionally, the height of the projection 80 relative to the rest of face 76 and the depth of the recess 78 relative to the rest of the face 74 are quite minimal. For instance, the height of the projection 80 and the depth of the recess 78 can be less than 1 inch, 0.75 inches, 0.5 inches, 0.25 inches, or 0.1 inch.

The actual dimensions of the recess 78 and the projection 80, and particularly the volume of recess 78 where fluid may accumulate, maybe selected such that the amount of fluid that may accumulate therein would be below predetermined levels. Such predetermined levels may be selected based on the types of fluids being transferred through coupling 10. For instance, the volume of recess 78 may be larger for non-hazardous fluids than four hazardous fluids. In the case of hazardous fluids, the volume of recess 78 may be limited such that the amount of the hazardous fluid that could accumulate therein would not be hazardous to the environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid system coupling, comprising:
    an adaptor having a body at least partially defining a fluid passageway therethrough and an adaptor poppet movably disposed therein, the adaptor poppet being movable between an open position and a closed position, the adaptor poppet being configured to seal off an open end of the adaptor when the adaptor poppet is in the closed position, the adaptor poppet being biased toward the closed position, the adaptor poppet having a poppet face that is substantially planar and devoid of any recesses;
    a coupler having a body at least partially defining a fluid passageway therethrough, the coupler being selectively connectable to the adaptor, the coupler having a coupler poppet movably disposed therein such that the coupler poppet is movable between an open position and a closed position, the coupler poppet being configured to seal off an open end of the coupler when the coupler poppet is in the closed position, the coupler poppet having a poppet face that is substantially planar and devoid of any recesses, the poppet faces of the adaptor poppet and the coupler poppet having corresponding alignment features, each of the corresponding alignment features taking up less than 5% of the associated poppet face; and
    an actuation mechanism associated with the coupler, the actuation mechanism being configured to move the coupler poppet from the closed position to the open position, wherein movement of the coupler poppet from the closed position to the open position causes the coupler poppet to engage the adaptor poppet and move the adaptor poppet from the closed position to the open position.

2. The fluid system coupling as recited in claim 1, wherein at least 50% of the poppet face of the adaptor poppet is planar and devoid of any recesses.

3. The fluid system coupling as recited in claim 1, wherein at least 75% of the poppet face of the adaptor poppet is planar and devoid of any recesses.

4. The fluid system coupling as recited in claim 1, wherein at least 95% of the poppet face of the adaptor poppet is planar and devoid of any recesses.

5. The fluid system coupling as recited in claim 1, wherein at least 99% of the poppet face of the adaptor poppet is planar and devoid of any recesses.

6. The fluid system coupling as recited in claim 1, wherein at least 50% of the poppet face of the coupler poppet is planar and devoid of any recesses.

7. The fluid system coupling as recited in claim 1, wherein at least 75% of the poppet face of the coupler poppet is planar and devoid of any recesses.

8. The fluid system coupling as recited in claim 1, wherein at least 95% of the poppet face of the coupler poppet is planar and devoid of any recesses.

9. The fluid system coupling as recited in claim 1, wherein at least 99% of the poppet face of the coupler poppet is planar and devoid of any recesses.

10. The fluid system coupling as recited in claim 1, wherein the alignment features take up less than 1 square inch on each of the poppet faces.

11. The fluid system coupling as recited in claim 1, wherein the alignment features take up less than 0.25 square inches on each of the poppet faces.

12. The fluid system coupling as recited in claim 1, wherein at least one of the alignment features comprises a recess formed in one of the poppet faces.

13. The fluid system coupling as recited in claim 12, wherein the recess has a depth of less than 0.25 inches.

14. A fluid system coupling, comprising:
    an adaptor having a body at least partially defining a fluid passageway therethrough and an adaptor poppet movably disposed therein, the adaptor poppet being movable between an open position and a closed position, the adaptor poppet being configured to seal off an open end of the adaptor when the adaptor poppet is in the closed position, the adaptor poppet being biased toward the closed position, the adaptor poppet having a poppet face, at least 95% of the poppet face comprises a uniform planar surface that is devoid of any recesses;

a coupler having a body at least partially defining a fluid passageway therethrough, the coupler being selectively connectable to the adaptor, the coupler having a coupler poppet movably disposed therein such that the coupler poppet is movable between an open position and a closed position, the coupler poppet being configured to seal off an open end of the coupler when the coupler poppet is in the closed position, the coupler poppet having a poppet face, at least 95% of the poppet face comprises a uniform planar surface that is devoid of any recesses wherein the poppet faces of the adaptor poppet and the coupler poppet comprise corresponding alignment features, including at least one projection and one recess; and an actuation mechanism associated with the coupler, the actuation mechanism being configured to move the coupler poppet from the closed position to the open position, wherein movement of the coupler poppet from the closed position to the open position causes the coupler poppet to engage the adaptor poppet and move the adaptor poppet from the closed position to the open position.

15. The fluid system coupling as recited in claim 14, wherein at least 98% of each of the poppet faces comprises a uniform planar surface that is devoid of any recesses.

16. The fluid system coupling as recited in claim 14, wherein the least one recess has a depth of less than 0.25 inches.

17. A fluid system coupling, comprising:

an adaptor having a body at least partially defining a fluid passageway therethrough and an adaptor poppet movably disposed therein, the adaptor poppet being movable between an open position and a closed position, the adaptor poppet being configured to seal off an open end of the adaptor when the adaptor poppet is in the closed position, the adaptor poppet being biased toward the closed position, the adaptor poppet having a poppet face, at least 95% of the poppet face comprises a uniform planar surface that is devoid of any recesses, the poppet face further comprising an alignment feature that takes up less than 5% of the poppet face, the alignment feature having a height or depth that is less than 0.25 inches relative to the uniform planar surface of the poppet face;

a coupler having a body at least partially defining a fluid passageway therethrough, the coupler being selectively connectable to the adaptor, the coupler having a coupler poppet movably disposed therein such that the coupler poppet is movable between an open position and a closed position, the coupler poppet being configured to seal off an open end of the coupler when the coupler poppet is in the closed position, the coupler poppet having a poppet face, at least 95% of the poppet face comprises a uniform planar surface that is devoid of any recesses, the poppet face further comprising an alignment feature that takes up less than 5% of the poppet face, the alignment feature having a height or depth that is less than 0.25 inches relative to the uniform planar surface of the poppet face; and an actuation mechanism associated with the coupler, the actuation mechanism being configured to move the coupler poppet from the closed position to the open position, wherein movement of the coupler poppet from the closed position to the open position causes the coupler poppet to engage the adaptor poppet and move the adaptor poppet from the closed position to the open position.

18. The fluid system coupling as recited in claim 17, wherein the alignment features are centered on the poppet faces.

\* \* \* \* \*